(12) United States Patent
Chen

(10) Patent No.: US 11,577,140 B2
(45) Date of Patent: Feb. 14, 2023

(54) DETERMINING FENCING BLADE QUALITY USING DYNAMIC MAGNETIC FIELD MEASUREMENTS

(71) Applicant: Lucas Chen, Pasadena, CA (US)

(72) Inventor: Lucas Chen, Pasadena, CA (US)

( * ) Notice: Subject to any disclaimer, the term of this patent is extended or adjusted under 35 U.S.C. 154(b) by 822 days.

(21) Appl. No.: 16/422,731

(22) Filed: May 24, 2019

(65) Prior Publication Data
US 2019/0275400 A1    Sep. 12, 2019

(51) Int. Cl.
   *G01N 27/80*   (2006.01)
   *A63B 69/02*   (2006.01)
   *F41B 13/02*   (2006.01)
   *A63B 71/04*   (2006.01)

(52) U.S. Cl.
   CPC .............. *A63B 69/02* (2013.01); *A63B 71/04* (2013.01); *F41B 13/02* (2013.01); *G01N 27/80* (2013.01)

(58) Field of Classification Search
   CPC ......... A63B 69/02; A63B 71/04; F41B 13/02; G01N 27/00; G01N 27/80; G01N 27/82; G01N 27/83; G01N 2291/0289; G01N 19/08; G01N 21/88; G01N 21/8851
   See application file for complete search history.

(56) References Cited

U.S. PATENT DOCUMENTS

2012/0068696 A1 * 3/2012 Mizutani ................ G01N 27/82
                                                    324/234
2016/0084921 A1 * 3/2016 Wen ...................... G01R 33/038
                                                    324/259

FOREIGN PATENT DOCUMENTS

EP         3658922 B1 * 12/2021 .............. G01P 21/02
JP     2002014081 A  *  1/2002

* cited by examiner

*Primary Examiner* — Son T Le
(74) *Attorney, Agent, or Firm* — McDermott Will & Emery LLP

(57) ABSTRACT

An apparatus may determine the quality of a fencing blade. The apparatus may include an electrical current source; a fencing blade to be tested for quality; two electrical cables, each connected between the electrical current source and the fencing blade so as to cause current from the current source to travel through at least a portion of the fencing blade; and a magnetic field sensor in sufficient proximity to the fencing blade so as to enable the magnetic field sensor to detect a magnetic field generated by the fencing blade when the current passes through the fencing blade.

16 Claims, 4 Drawing Sheets

|  | STATIC MAGNETIC FIELD | | DYNAMIC MAGNETIC FIELD | | | MICROHARDNESS |
|---|---|---|---|---|---|---|
|  | MAGNETIC STRENGTH | DIRECTION OF MAXIMUM MAGNETIC FIELD | MAGNETIC STRENGTH X DIRECTION | MAGNETIC STRENGTH | DIRECTION OF MAXIMUM MAGNETIC FIELD | MAGNETIC STRENGTH X DIRECTION |  |
| VENDOR #1 | 60.5µT | -142° | -8591µT° | 55.9µT | -154° | -8608µT° | 572 |
| VENDOR #2 | 63.8µT | -140° | -8932µT° | 60.7µT | -151° | -9165µT° | 651 |

FIG. 4

DETERMINING FENCING BLADE QUALITY USING DYNAMIC MAGNETIC FIELD MEASUREMENTS

BACKGROUND

Technical Field

This disclosure relates to fencing weapons, magnetic fields, and fencing weapon quality.

Description of Related Art

The sport of fencing is as old as the history of warfare, as soldiers practiced and drilled sword fighting in their extra time. Fencing became an official Olympic sport in 1896, with the Athens Olympic Games. The sport is now divided into three weapon classes: foil, epee, and saber. As the rules and scoring are different, each fencing category has evolved differently. Nevertheless, all modern-day fencing weapons are made with similar material, predominantly carbon tempered steel alloys.

This steel may be made primarily of raw iron, which may contain varying amount of carbon (e.g., 0.25-2%), sulfur (e.g., <0.05%), phosphorus (e.g., <0.04%), and silicon (e.g., 0.3-0.5%). The iron may be mixed with different elements, such as manganese, nickel, chromium, molybdenum, vanadium, silicon, boron, aluminum, cobalt, copper, cerium, niobium, titanium, tungsten, tin, zinc, lead, and/or zirconium, to give specific hardness, flexibility, and other properties. The most commonly utilized steel in fencing may be maraging steel, which may possess both strength and malleability. The steel may be 17-19% nickel, 8-12% cobalt, 3-5% molybdenum, and 0.6-1.2% titanium.

Just like in the days of medieval warfare, the quality of the fencing blade is still important today. A blade that has a lower hardness may be more easily corroded, deformed, and/or shattered, thus creating a safety danger.

Despite the importance of blade quality, it can be difficult for a fencer to differentiate between blades of high and low quality, as many blades have similar appearance and feel. Fencers instead may rely upon brand labelling. But any brand, however famous or expensive, can be made of good or inferior batches of metal during production. In addition, the prevalence of counterfeits can leave any fencer vulnerable to injury from a broken blade.

Traditional methods of testing metal, such an appearance testing (color and machine marks), spark testing (grinding metal to generate sparks and to assess steel quality based on sparks color and quality), and the Rockwell or Brinell or Vickers tests (estimate metal hardness by measuring the depth or width of indentation from a pounding machine), can be subjective and inaccurate.

Modern tests may be less subjective, such as X-ray fluorescence and atomic emission spectrometry (blast metal with high energy x-rays to measure the excited x-ray or light emittance) or laser-induced breakdown spectrometer (laser blasts of metal generates plasma that can be analyzed for atomic composition). But these tests can require expensive and cumbersome equipment.

A system and method for testing the quality of fencing blades that is easy, economical, and compact is therefore needed.

SUMMARY

An apparatus may determine the quality of a fencing blade. The apparatus may include an electrical current source; a fencing blade to be tested for quality; two electrical cables, each connected between the electrical current source and the fencing blade so as to cause current from the current source to travel through at least a portion of the fencing blade; and a magnetic field sensor in sufficient proximity to the fencing blade so as to enable the magnetic field sensor to detect a magnetic field generated by the fencing blade when the current passes through the fencing blade.

The electrical current source may generate current at multiple different selectable levels.

The magnetic field sensor may measure both magnetic field intensity and direction. The magnetic field sensor may be part of a mobile phone.

The apparatus may include a blade holder that does not include any ferrous material and that detachably but firmly holds the fencing blade in a fixed position.

The apparatus may include a sensor holder that does not include any ferrous material and that detachably but firmly holds the magnetic field sensor in a fixed position.

The guard end of the fencing blade may have a configuration that attaches to a guard so as to form a fencing weapon.

Electric cable may be attached to the blade. The guard may be detached from the fencing blade.

A process for determining the quality of a fencing blade may include electrically and detachably connecting an electrical current source to the fencing blade so as to cause current from the current source to travel through at least a portion of the fencing blade; placing a magnetic field sensor in sufficient proximity to the fencing blade so as to enable the magnetic field sensor to detect a magnetic field generated by the fencing blade when the current passes through the fencing blade; activating the electrical current source to cause current from the current source to travel through at least a portion of the fending blade; measuring the magnetic field produced by the fencing blade while current is travelling through the fencing blade using the magnetic field sensor; and determining the quality of the fencing blade based on the measured magnetic field.

The process may include measuring the earth's magnetic field with the magnetic field sensor before the fencing blade is in proximity to the magnetic field sensor and using this measurement as part of the determining the quality of the fencing blade.

The process may include measuring the earth's magnetic field with the magnetic field sensor while the fencing blade is in proximity to the magnetic field sensor, but before current is applied to the fencing blade, and using this measurement as part of the determining the quality of the fencing blade.

The process may include causing current at different levels to travel through the at least portion of the fencing blade; measuring the magnetic field produced by the fencing blade with the magnetic field sensor while current is travelling through the fencing blade at each of the different levels; and determining the quality of the fencing blade based on all of the measured magnetic fields.

The determining the quality of the fencing blade may include comparing the measured magnetic field to a measured magnetic field of a known fencing blade having a known degree of quality The known degree of quality may include a known degree of the hardness of the known fencing blade.

The process may include adjusting the position of the fencing blade relative to the earth's magnetic field.

The process may include adjusting the position of the magnetic field sensor relative to the earth's magnetic field.

The process may include adjusting the position of the fencing blade relative to the position of the magnetic field sensor.

The fencing blade may be part of a fencing weapon that includes a guard which has been detached from the fencing blade before the measuring step.

The fencing blade may include a guard end that has a configuration that connects to a guard.

The process may include detaching the guard from the fencing blade before the measuring.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 4 illustrates an example of magnetic field measurements made of two different fencing blades having known degrees of hardness.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Figure 1:
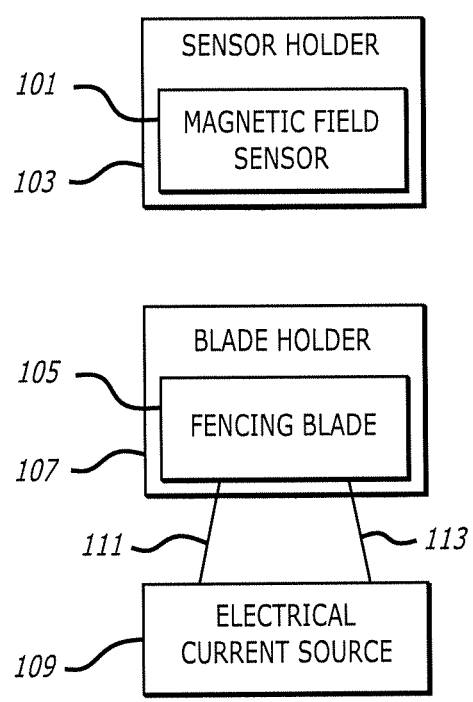
FIG. 1 illustrates an example of an apparatus for determining the quality of fencing blades.

FIG. 1 illustrates an example of an apparatus for determining the quality of fencing blades. As illustrated in FIG. 1, the apparatus may include a magnetic field sensor 101 securely held in position by a sensor holder 103, a fencing blade 105 securely held in position by a blade holder 107, and an electrical current source 109 connected to the fencing blade by electrical cables 109 and 111.

The magnetic field sensor 101 may be of any type. The magnetic field sensor 101 may be capable of measuring the magnitude and/or direction of a magnetic field in which the sensor is present. The magnetic field sensor 101 may include a magnetometer, which may be part of another device, such as a mobile phone, such as an Apple iPhone, Samsung Galaxy, or Google Pixel. When the magnetometer in a mobile phone is used, an application may be added to the mobile phone that accesses and displays magnetic field information sensed by the magnetometer, such as the Magnetscape v. 1.1 (available from Toon, iic), EMF Detector (available from Appreciate Studios), and Tesla Recorder (available from Exelerus).

Figure 2:
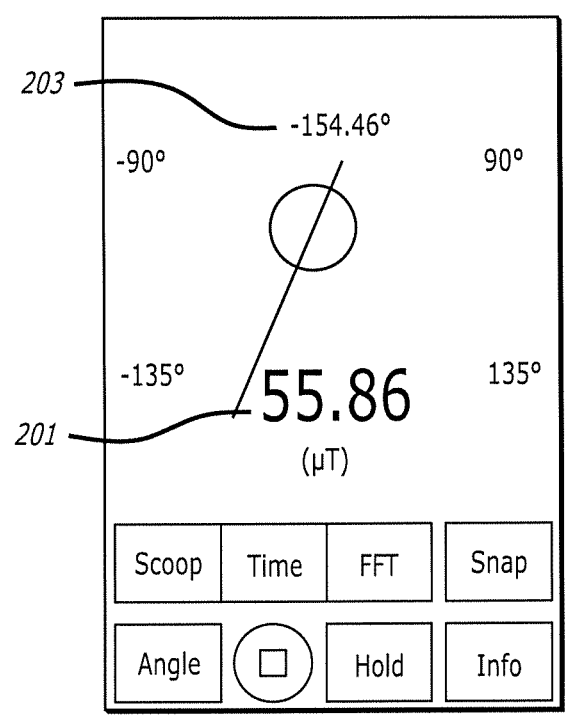
FIG. 2 illustrates an example of magnetic field measurements displayed on a mobile phone.

FIG. 2 illustrates an example of magnetic field measurements displayed on a mobile phone. In this example, the measurements are being made by a magnetometer in a iPhone X using the Magnetscape App mobile phone running the [Lucas: name of application generating this display]. As illustrated in FIG. 2, the display may include magnitude information 201 that indicates the magnitude of the magnetic field surrounding the magnetometer, as well as directional information 203 that indicates the vector direction of this magnetic North Pole or other reference.

Returning to FIG. 1, the sensor holder 103 may be of any type. For example, the sensor holder 103 may be made of nonferrous material, such as rubber or plastic. The sensor holder 103 may have a configuration that easily permits the magnetic field sensor 101 to be attached to (e.g., by a snapping or strapping action) and detached from (e.g., by an un-snapping or un-strapping action) the sensor holder 103. The sensor holder 103 may hold the magnetic field sensor 101 in a secure position when attached to the sensor holder 103. Examples of sensor holders include the Phone Tripod Mount Adapter, PEYOU Universal 360 Rotation Smartphone Holder Monopod Adapter Clamp Bracket, Aduro Solid-Grip Phone Holder for Desk-Adjustable Universal Gooseneck Smartphone Stand, with Durable Rubberized Mount, and Lamicall Cell Phone Stand, Phone Dock. All of these sensor holders may be purchased from Amazon.

The fencing blade 105 may be of any type. For example, the fencing blade 105 may be part of a saber, foil, or epee. The fencing blade may be made of steel. The fencing blade 105 may be configured to attach to a guard at one end of the blade. The guard may be attached to the fencing blade during testing or may be detached from the fencing blade before the testing and not included during testing.

The blade holder 107 may be of any type. For example, the blade holder 107 may be made of nonferrous material, such as rubber or plastic. The blade holder 103 may have a configuration that easily permits the fencing blade 105 to be attached to (e.g., by a snapping or strapping action) and detached from (e.g., by an un-snapping or un-strapping action) the blade holder 107. The blade holder 107 may hold the fencing blade 105 in a secure position when attached to the blade holder 107. Examples of fencing blade holders include the Duttek 2-Slot Rubber Car Anti-Slip Anti Slide Sticky Grip Gel Mat Cell Phone Mount Holder Mat, the Wedge Guys Rubber Vise Clamp for Golf Club Repair Regripping Reshafting Refinishing Custom, and the bdRubber Fishing Rod Pole Storage Clips Clamps Holder. These may all be purchased Amazon.

The electrical current source 109 may be of any type. For example, the electrical current source 109 may include one or more batteries, photocells, or electronic power supplies. Examples of batteries include the ExpertPower 12V 7 Amp EXP1270 Rechargeable Lead Acid Battery, Tenergy 9V NiMH Battery High Capacity 250 mAh Rechargeable 9 Volt Battery, and Eveready 6 Volt Lantern Battery. These may be purchased at Amazon. The electrical current source 109 may be configured to deliver a DC or AC current at a predetermined or user-specified level, or at one of several user-selected levels of current.

The electrical cables 109 and 111 may be configured to readily conduct electricity and may be of any type. For example, the electric cables 109 and 111 may be copper or aluminum wires or other types of elongated lengths of electrically conductive metal.

Each of the electrical cables 109 and 111 may be connected at one of their ends to the electrical current source 109. The other ends of the electrical cables 109 and 111 may be detachably connected to the fencing blade 105 at different locations on the blade. For example, one of electrical cables may be detachably attached at the end of the fencing blade that attaches to the guard. The other electrical cable may be detachably connected to another location on the blade, such as at the tip of the blade, or at any point in between. Alligator clips may be included at one end of each electrical cable to facilitate their detachable connection with the blade.

Figure 3:
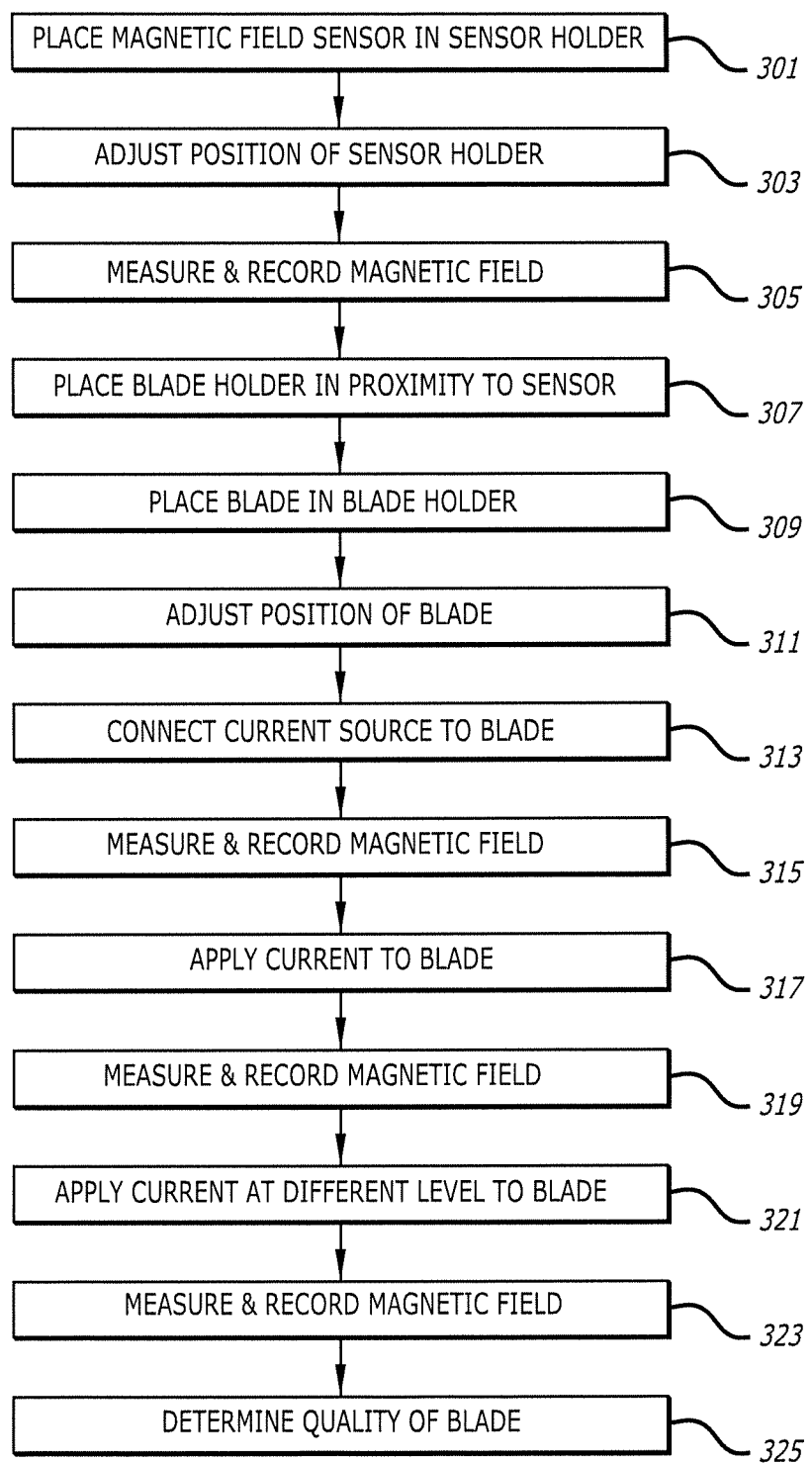
FIG. 3 illustrates an example of a process for determining the quality of fencing blades.

FIG. 3 illustrates an example of a process for determining the quality of fencing blades.

The process may include a Place Magnetic Field Sensor in Sensor Holder step 301. During this step, the magnetic field sensor 101 may be firmly attached to the sensor holder 103 so as to ensure that it does not accidentally move during the testing process. In some embodiments of this process, a sensor holder may not be used, in which case this placement step may be omitted.

The process may include an Adjust Position of Sensor Holder step 303. During this step, the rotational position of the sensor holder 103 may be adjusted until the directional information 203 indicates a desired reference direction, such as 0°. In some embodiments of this process, a sensor holder may not be used, in which case the rotational position of the magnetic field sensor 101 may be adjusted directly. In some embodiments of this process, adjustment of the rotational position of the sensor holder 103 and/or the magnetic field sensor 101 itself may be omitted.

The process may include a Measure and Record Magnetic Field step 305. During this step, measurements of the static magnetic field (i.e., caused by gravity) may be made by the magnetic field sensor 101, such as its magnitude information 201 and directional information 203, and recorded. This measurement may be made without the fencing blade 105 being in the fencing blade holder 107 or otherwise in proximity to the magnetic field sensor 101. (A magnetic field that does not include flux caused by current running through the fencing blade 105 is sometimes referred to herein as a static magnetic field, while a magnetic field that does include flux cause by current running through the fencing blade 105 is sometimes referred to herein as a dynamic magnetic field.) In some embodiments of this process, this step measurement may be omitted.

The process may include a Place Blade Holder in Proximity to Sensor step 307. During this step, the blade holder 107 may be placed anywhere that will cause the magnetic field sensor 101 to be located somewhere along the length of the fencing blade 105 that will be later added and approximately at the midpoint of where the electrical cables 111 and 113 will connect to the fencing blade 105. In some configurations, the sensor holder 103 and the blade holder 107 may be part of a rigid apparatus that may impose a fixed separation distance between the two, in which case this step may be omitted. In some configurations, the blade holder 107 may not be used, in which case this step may be performed directly on the fencing blade 105.

The process may include a Place Blade in Blade Holder step 309. During this step, the fencing blade 105 (with or without the guard) may be placed in the blade holder 107 in a fixed position. In some embodiments, the blade holder 107 may be omitted, in which case this step may be omitted.

The process may include an Adjust Position of Blade step 311. During this step, the angular position of the fencing blade 105 may be adjusted relative to the North pole and/or the angular position of the magnetic field sensor 101. The location of the fencing blade 105 relative to the magnetic field sensor 101 may also be adjusted. For example, the position of the fencing blade 105 may be adjusted so as to cause the magnetic field sensor 101 to be located in very close proximity (e.g., 0-3 inches away) to the magnetic field sensor 101 somewhere along the length of the fencing blade 105 and approximately at the midpoint between where the electrical cables 111 and 113 will connect to the fencing blade 105.

The process may include a Connect Current Source to Blade step 313. During this step, the electrical current source 109 may be detachably connected to the fencing blade 105 using the electrical cables 111 and 113 and, when present, the alligator clips at each of the ends of the electrical cables 111 and 113. For example, one of electrical cables may be detachably attached at the fencing blade end that attaches to the guard. The other electrical cable may be detachably connected to another location on the blade, such as at the tip of the blade or at any point in between. The separation distance between the points on the fencing blade to which the electrical cables 111 and 113 attach may vary. For example, these points may be separated by 3 or 12 inches or by another amount. The position of the fencing blade 105 and/or the magnetic field sensor 101 may be adjusted so as to cause the magnetic field sensor 101 to be located in very close proximity (e.g., 0-3 inches away) to the magnetic field sensor 101 somewhere along the length of the fencing blade 105 and approximately at the midpoint between where the electrical cables 111 and 113 will connect to the fencing blade 105.

The process may include a Measure and Record Magnetic Field step 315. During this step, a measurement of the static magnetic field (caused by gravity, as altered by the presence of the fencing blade 105) may be made by the magnetic field sensor 101, such as its magnitude information 201 and directional information 203, and recorded. In some embodiments of this process, the step may be omitted.

The process may include an Apply Current to Blade step 317. During this step, the electrical current source 109 may be activated to cause an AC or DC current to flow through the portion of the fencing blade 105 that lies between its two points of connection to the two electrical cables 111 and 113.

The process may include a Measure and Record Magnetic Field step 319. During this step, a measurement of the dynamic magnetic field (caused by gravity and the current traveling through the fencing blade 105) may be made by the magnetic field sensor 101, such as its magnitude information 201 and directional information 203, and recorded.

The process may include an Apply Current at Different Level to Blade step 321. During this step, the electrical current source 109 may be adjusted to cause a different level of AC or DC current to flow through the portion of the fencing blade 105 that lies between the two points of connection to the two electrical cables 111 and 113. In some embodiments of this process, the step may be omitted.

The process may include a Measure and Record Magnetic Field step 323. During this step, a measurement of the dynamic magnetic field (caused by gravity and the different level of current traveling through the fencing blade 105) may be made by the magnetic field sensor 101, such as its magnitude information 201 and directional information 203, and recorded. If step 321 was omitted, this step 323 may be omitted as well.

Although not illustrated in FIG. 3, the process may include one or more additional Applying Current at Different Level to Blade steps, each at a still further different current level, and, for each, an additional Measure and Record Magnetic Field step.

The process may include a Determine quality of Blade step 225. During this step, the quality of the fencing blade 105 may be determined based on one or more or all of the magnetic field measurements that were recorded during the process.

Various approaches may be followed to make this quality determination. For example, the magnitude of the measured dynamic magnetic fields may be taken as being indicative of the hardness of the tested fencing blade 105, with larger magnitudes being indicative of harder. In turn, these indications of hardness may be taken as indicative of the quality of the fencing blade 105, with harder measurement being indicative of greater quality. The one or more static magnetic field measurements may be used to normalize the dynamic magnetic field measurements, based on differences in the geographic location and other environmental factors of the test.

The quality determination may also be based upon comparing the magnetic field measurements of the fencing blade that is being tested with comparable magnetic field measurements made of fencing blades having known degrees of quality, such as known degrees of hardness. The measurements of the fencing blades of having known degrees of quality may be taken by substantially same the apparatus in substantially the same location for enhanced accuracy.

FIG. 4 illustrates an example of magnetic field measurements made of two different fencing blades have known degrees of hardness. The hardness numbers shown in this figure were made by Testing Engineer, Inc. in San Leandro, Calif.) using a Leco Microhardness Model: FM-1E S/N' FMI 119 machine and reported as Vickers hardness scale. As illustrated in FIG. 4, higher levels of hardness may cause higher magnitudes of both static (while the blade is present) and dynamic magnetic fields. As also illustrated in FIG. 4, the product of the field direction and strength may similarly be indicative of quality, with higher values again indicating a higher level of hardness and thus quality.

The process that has been described may only test the quality of the fencing blade 105 in areas that lie between the points at which the two electrical cables 111 and 113 are attached. When these two points do not include the entire length of the blade, steps 213-225 of the process may be repeated with the current source being connected to different segments of the blade's length, thus providing quality information about these different segments, until the entire length of the fencing blade 105 has been tested. By sequentially testing smaller lengths of the fencing blade 105, a higher degree of accuracy in the quality determination may result.

What has now been described may provide a rapid method of identification based on its magnetic properties. Only a few elements have magnetic property, including iron, nickel, cobalt, gadolinium, and dysprosium. Since metal of different grades and quality may contain different ratios of these elements, each blade may have a different baseline magnetic profile (strength and direction of maximum magnetic field). In addition, since magnetic properties can change while conducting electricity, each blade may demonstrate unique magnetic profiles at different levels of electricity (dynamic magnetic property). By making and analyzing these measurements, a fencer may be able to determine the hardness and thus quality of the blade.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and advantages. These also include embodiments in which the components and/or steps are arranged and/or ordered differently.

For example, the apparatus and processes that have been described may be applied to other type of metal objects to similarly determine their composition, quality, and/or hardness. Examples of such other objects include I-beams, steel bolts, steel plates, machine parts (such as a propeller blade, gears, and steel engine shafts), and steel medical implants (such as artificial hips, artificial knees, and dental implants). These apparatuses and processes may be used at a construction site to verify steel grade, at a factory to verify the steel composition of an airplane or automobile part, or to test the authenticity of medical steel implants such as a prosthetic hip or knee. They may also be used at home by a fencing enthusiast.

This test may also be used to assess the hardness and thus quality of the fencing mask.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

A process for determining the quality of a fencing blade may include electrically and detachably connecting an electrical current source to the fencing blade so as to cause current from the current source to travel through at least a portion of the fencing blade; placing a magnetic field sensor in sufficient proximity to the fencing blade so as to enable the magnetic field sensor to detect a magnetic field generated by the fencing blade when the current passes through the fencing blade; activating the electrical current source to cause current from the current source to travel through at least a portion of the fending blade; measuring the magnetic field produced by the fencing blade while current is travelling through the fencing blade using the magnetic field sensor; and determining the quality of the fencing blade based on the measured magnetic field.

The invention claimed is:

1. An apparatus for determining the quality of a fencing blade comprising:
   an electrical current source;
   a fencing blade to be tested for quality;
   two electrical cables, each connected between the electrical current source and the fencing blade so as to cause current from the current source to travel through at least a portion of the fencing blade; and
   a magnetic field sensor in sufficient proximity to the fencing blade so as to enable the magnetic field sensor to detect a magnetic field generated by the fencing blade when the current passes through the fencing blade,
   wherein the electrical current source is configured to generate current at multiple different selectable levels, and
   wherein the magnetic field sensor is part of a mobile phone, and the magnetic field sensor is configured to measure both magnetic field intensity and direction of the fencing blade before current travels through the fencing blade and while current travels through the fencing blade at each of the multiple different selectable levels.

2. The apparatus of claim 1, further comprising a blade holder that does not include any ferrous material and that detachably but firmly holds the fencing blade in a fixed position.

3. The apparatus of claim 1, further comprising a sensor holder that does not include any ferrous material and that detachably but firmly holds the magnetic field sensor in a fixed position.

4. The apparatus of claim 1, wherein a guard end of the fencing blade has a configuration that attaches to a guard so as to form a fencing weapon.

5. The apparatus of claim 4, wherein the guard has been detached from the fencing blade.

6. A process for determining the quality of a fencing blade comprising:
   electrically and detachably connecting an electrical current source to the fencing blade so as to cause current from the current source to travel through at least a portion of the fencing blade;
   placing a magnetic field sensor in sufficient proximity to the fencing blade so as to enable the magnetic field sensor to detect a magnetic field generated by the fencing blade when the current passes through the fencing blade, wherein the magnetic field sensor is part of a mobile phone;
   measuring magnetic field intensity and direction of the fencing blade before current travels through the fencing blade;
   activating the electrical current source to cause current from the current source to travel through at least a portion of the fending blade;
   causing current at different levels to travel through the at least portion of the fencing blade;
   measuring the magnetic field produced by the fencing blade with the magnetic field sensor while current is travelling through the fencing blade at each of the different levels; and
   determining the quality of the fencing blade based on all of the measured magnetic fields.

7. The process of claim 6 further comprising:
   measuring earth's magnetic field with the magnetic field sensor before the fencing blade is in proximity to the magnetic field sensor and using this measurement as part of the determining the quality of the fencing blade.

8. The process of claim 6, further comprising:
   measuring earth's magnetic field with the magnetic field sensor while the fencing blade is in proximity to the magnetic field sensor, but before current is applied to the fencing blade, and using this measurement as part of the determining the quality of the fencing blade.

9. The process of claim 6, wherein the determining the quality of the fencing blade includes comparing the measured magnetic field to a measured magnetic field of a known fencing blade having a known degree of quality.

10. The process of claim 9, wherein the known degree of quality includes a known degree of the hardness of the known fencing blade.

11. The process of claim 6, further comprising
    adjusting the position of the fencing blade relative to earth's magnetic field.

12. The process of claim 6, further comprising adjusting the position of the magnetic field sensor relative to earth's magnetic field.

13. The process of claim 6, further comprising
    adjusting the position of the fencing blade relative to the position of the magnetic field sensor.

14. The process of claim 6, wherein the fencing blade is part of a fencing weapon that includes a guard which has been detached from the fencing blade before the measuring step.

15. The process of claim 6, wherein the fencing blade includes a guard end that has a configuration that connects to a guard.

16. The process of claim 15, further comprising
    detaching the guard from the fencing blade before the measuring.

* * * * *